United States Patent [19]

Nakayama

[11] Patent Number: 4,819,843
[45] Date of Patent: Apr. 11, 1989

[54] DRINK CONTAINER HOLDER
[75] Inventor: Hiromichi Nakayama, Yokohama, Japan
[73] Assignee: Nifco Inc., Yokohama, Japan
[21] Appl. No.: 116,295
[22] Filed: Nov. 4, 1987
[30] Foreign Application Priority Data
   Nov. 6, 1986 [JP] Japan ................. 61-262743
[51] Int. Cl.$^4$ ............ B60N 3/00; B60R 7/00; B60R 11/00
[52] U.S. Cl. ............... 224/42.45 R; 108/44; 220/85 H; 224/42.46 R; 248/311.2; 211/81
[58] Field of Search ........ 224/273, 42.45 R, 42.46 R, 224/42.46 A, 42.45 A; 248/311.2, 138; 211/81, 86, 74; 220/85 H; 108/44, 46

[56] References Cited
U.S. PATENT DOCUMENTS

| | | | |
|---|---|---|---|
| 3,842,981 | 10/1974 | Lambert | 224/42.45 R X |
| 4,248,397 | 2/1981 | Casper | 248/311.2 X |
| 4,434,961 | 3/1984 | Hoye | 248/311.2 |
| 4,629,153 | 12/1986 | Marcum | 108/46 |

Primary Examiner—J. R. Scott
Attorney, Agent, or Firm—Schwartz & Weinrieb

[57] ABSTRACT

A drink container holder comprises three members: a mounting base having a mounting device for mounting within a vehicle such as an automobile, a holding framework for holding a cup, and an intermediate pivotable framework interposed between the mounting base and the holding framework, the three members being pivotably connected to one another through means of pivotable shaft bearing portions. The mounting device comprises a substantially inverted U-shaped bracket, and the mounting base has dependent bearing portions integrally suspended therefrom. A substantially U-shaped bail member is provided upon the holding framework, and the mounting base, holding framework, and intermediate framework are pivotable with respect to each other about two axes orthogonally arranged with respect to each other such that the three members define in effect gimbal rings for supporting the drink container.

15 Claims, 2 Drawing Sheets

DRINK CONTAINER HOLDER

BACKGROUND OF THE INVENTION

1. Field of the Invention

This invention relates to a holder for a drink container for use in vehicles such as automobiles.

2. Description of the Prior Art

Large-sized vehicles such as sight-seeing buses are usually equipped with a drink container holder mounted upon the rear surface of the back of the seats, or at some other convenient location for the passengers. The holder of this type is often formed of metallic wire bent into a basket shape. Some of such holders are collapsible. Since the conventional holder fixedly holds the cup, it directly receives shocks and vibrations generated while the vehicle is travelling. This causes the contents to spill out of the cup.

OBJECT OF THE INVENTION

This invention has been developed in order to solve the above-mentioned problem characteristic of the conventional drink container holder. It is therefore an object of the present invention to provide a drink container holder which can be mounted at a suitable place inside a vehicle such as an automobile such that when a cup containing a beverage is placed within the holder, the cup is always held in its upright posture within the holder by means of the weight of the cup, so as to thereby effectively prevent the contents, particularly liquid contents, from spilling out of the cup when the cup becomes inclined due to swaying or vibration of the vehicle body, or for example, when the vehicle encounters bumpy or rough road conditions.

SUMMARY OF THE INVENTION

A drink container holder according to the present invention comprises three members, namely a mounting base having a mounting means for mounting the holder within a vehicle, a holding framework for holding a cup, and an intermediate pivotable framework interposed between the mounting base and the holding framework. When the holder comprising the three members pivotably connected to one another through means of pivotable shaft carrying portions is inclined due to an inclination of the automobile, the holding framework connected through means of the intermediate pivotable framework is pivoted about the shaft carrying portions utilizing the weight of the cup placed within the holding framework so as to always hold the cup in its upright posture so as to prevent the contents from spilling out of the cup.

BRIEF DESCRIPTION OF THE DRAWINGS

The above and other objects and features of the invention will become more apparent from the following detailed description with reference to the accompanying drawings, wherein.

DETAILED DESCRIPTION OF THE PREFERRED EMBODIMENT

Figure 1:
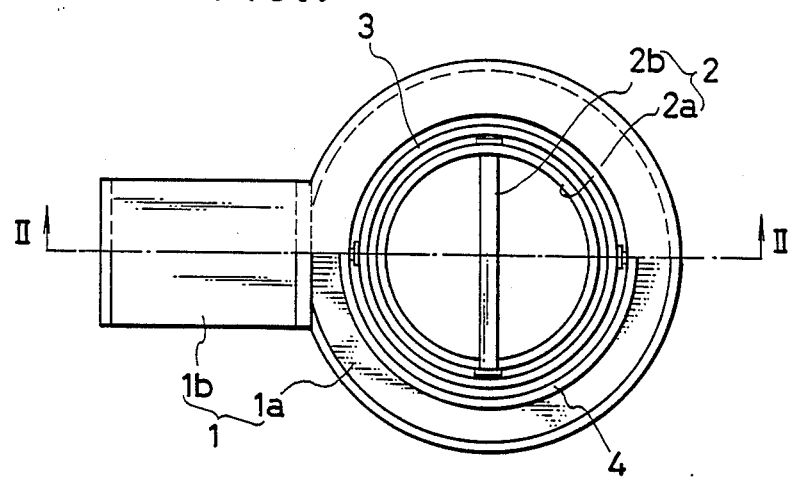
FIG. 1 is a plan view of one embodiment of a drink container holder according to the present invention, the lower half portion thereof being shown in a bottom view.
Figure 2:
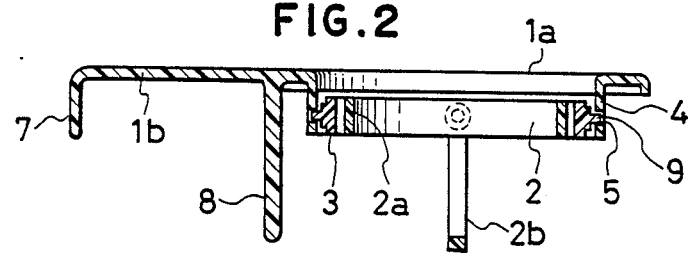
FIG. 2 is a sectional view taken along line II—II of FIG. 1.
Figure 3:
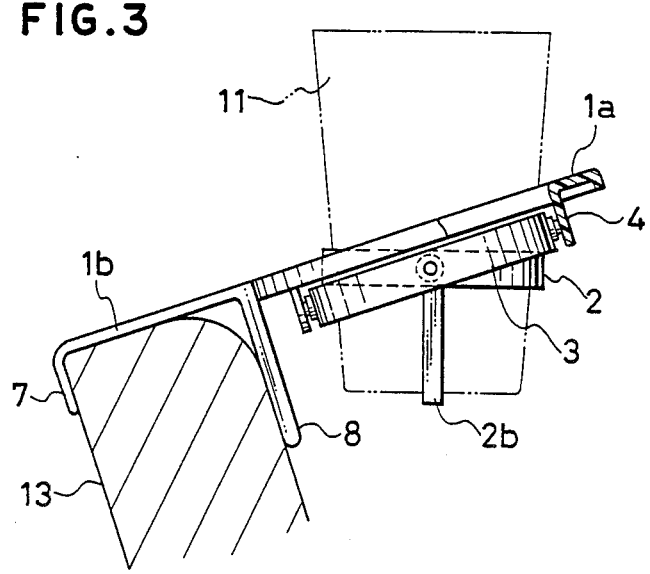
FIG. 3 is a schematic view showing the holder when in use.

The accompanying drawings illustrate one embodiment of a drink container holder according to the present invention, in which 1 denotes a mounting base, 2 a holding framework, and 3 an intermediate pivotable framework.

The mounting base 1 comprises an annular main body portion 1a having a central round hole, and a retaining arm piece 1b serving as a mounting means extending in the radial direction from the edge portion of the main body portion 1a. The main body portion 1a is provided with a skirt 4 having a short cylindrical shape extending downwardly from a circular inner peripheral portion thereof. A pair of pieces 5 serving as shaft bearing portions are provided at two opposing points with the central point of the skirt 4 therebetween. Each piece 5 is provided with a bearing hole 6 therein.

The retaining arm piece 1b is a mounting means for fastening the mounting base 1 at a suitable place within the automobile. In this embodiment, the arm piece is flat and is provided with a slightly thinner retaining piece 7 extending downwardly at right angles from the end thereof so as to be fastenable to an upper edge portion of a door of the automobile. The arm piece 1b is provided with a slightly thicker supporting piece 8 extending downwardly from the lower surface of its inner end portion in such a manner as to be opposed to the retaining piece 7 and to define therewith a substantially inverted U-shaped mounting bracket.

The intermediate pivotable framework 3 is adapted to mount the holding framework 2 upon the mounting base 1. The framework 3 has a short cylindrical shape so that it can be accommodated within the skirt 4 of the mounting base 1. The framework 3 is separately provided at two points on a first straight line passing through the center thereof with a pair of pivotably attaching shafts 9 serving as shaft bearing portions projecting radially outwardly and likewise at two points upon a second straight line crossing the first straight line at right angles thereto and at the center of the framework 3 with a pair of bearings 10 serving as shaft bearing portions which are formed by means of cutting the framework 3 from above.

On the other hand, the holding framework 2 is adapted to directly hold a cup 11. The framework 2 comprises a main body 2a having a cylindrical shape able to be accommodated within the intermediate pivotable body 3, and a U-shaped holding frame 2b extending downwardly from the main body 2a. The main body 2a is provided at the outer peripheral surface portion thereof with a pair of shafts 12 serving as pivotable shaft bearing portions.

The holder of this embodiment comprises one each of the mounting base 1, the holding framework 2, and the intermediate pivotable framework 3. These component members 1, 2 and 3 are separately made of a synthetic resin material and are assembled as follows.

Figure 4:
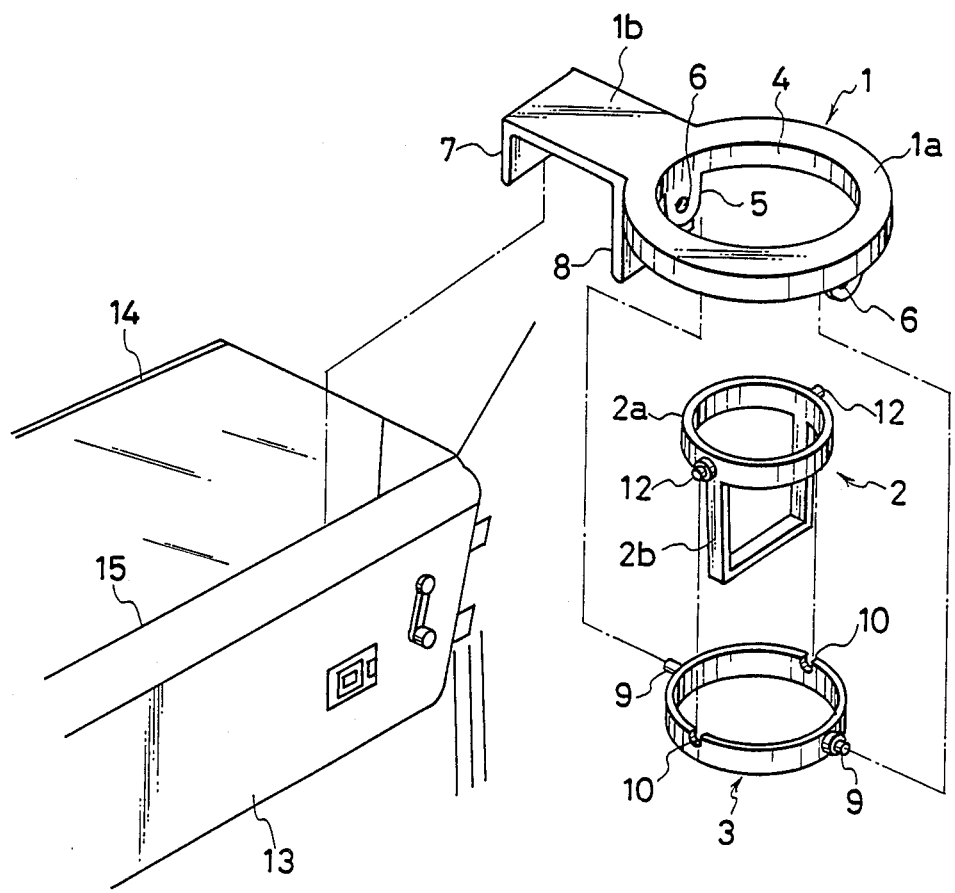
FIG. 4 is an exploded perspective view of the holder of FIG. 1.

First, as shown in FIG. 4, the holding framework 2 is placed into the molded intermediate pivotable framework 3 from above and the pivotably attaching shafts 12 formed upon the outer peripheral surface of the main body 2a are fitted into the shaft bearing portions 10. Then, the assembly of the holding framework 2 and the intermediate pivotable framework 3 is brought opposite the main body portion 1a of the mounting base 1 from a position therebeneath and fitted therein such that the pair of pivotably attaching shafts 9 projecting outwardly from the outer peripheral surface of the member 3 are brought into contact with the pieces 5 of the shaft bearing portions so as to slightly spread the pieces 5 outwardly in opposite directions; and thereby be fitted into the shaft bearing holes 6. In this way, the assembly of the holding framework 2 and the intermediate pivotable framework 3 is assembled within the mounting base 1.

It is preferable that the tip portion of each pivotably attaching shaft 9 have a slanted surface so that the shaft bearing portion 5 can be easily spread outwardly when the pivotably attaching shaft 9 is brought into contact with the shaft bearing portion 5.

The so-constructed drink container holder of the present invention is attached to a suitable place inside an automobile as follows. The retaining arm piece 1b is placed upon a door 13 so as to straddle the upper edge thereof and the retaining piece 7 provided upon the retaining arm piece 1b is retained upon an edge 15 of an accommodating portion for a window glass 14. At the same time, the supporting piece 8 is abutted against the inner wall of the door 13 and mounted thereon with the main body portion 1a held horizontally. In this state, the drink container holder of the present invention is able to hold the cup 11.

The cup 11 filled with a beverage is placed within the holding framework 2 from above so as to be received and held at the bottom thereof by means of the holding frame 2b.

In this way, since the holder of the present invention which has received the cup 11, receives the bottom of the cup 11 by means of the holding frame 2b of the holding framework 2, the cup 11 is able to be lowered or inserted into the holding frame 2b of the holding framework 2 with the pivotably attaching shafts 12 provided on the main body 2a serving as base points so as to hold the cup 11 in its upright posture.

When the inclination of the door is changed as the automobile travels, the main body 2a of the holding framework 2 is first guided to be in its horizontal posture as a result of the shaft bearing portions 10 which receive the pivotably attaching shafts 12 serving as base points. At the same time, the intermediate pivotable framework 3 is pivoted in the direction unable to be interfered with by means of pivotal movement of the holding framework 2, about the shaft bearing portions 5 of the mounting base 1 to which the pivotably attaching shafts 9 are snugly connected, so as to hold its horizontal posture. As a result, the holding framework 2 can always be held in its horizontal posture so as to prevent the contents from spilling out of the cup 11.

As described in the foregoing, since the drink container holder of the present invention is always caused to be in its horizontal posture by means of the weight of the cup received by the holding framework having as supporting points two shaft carrying portions which have different pivoting directions with respect to the pivotable axis of the intermediate framework by means of 90 degrees and holds the cup in its vertically upstanding posture, the contents do not spill out of the cup even if the automobile tilts. Moreover, since the guidance to the aforementioned horizontal posture always operates properly, the holding framework is always able to hold the cup in its horizontal posture even if it receives a swinging motion during the travel of the automobile.

Moreover, the holder of the present invention can be mounted at a suitable place such as upon a door of the automobile by a mounting means having a mounting base as described and can be easily detached therefrom by removing the retaining piece when not in use.

Furthermore, since the holder of the present invention comprises three members separately molded and which can be assembled by fitting the pivotably attaching shafts within the corresponding bearing or pivot holes or slots, it is easy to manufacture and the cost is low.

In addition, when the holder of the present invention is mounted upon a door or the like, the holding frame 2b of the holding framework 2 serves as a weight for holding the holding framework in its horizontal posture whereby the main body 2a has its annular opening facing upwardly. Accordingly, a cup can be smoothly placed therein. In this way, the holder of the present invention is easy to handle and use.

Obviously, many modifications and variations of the present invention are possible in light of the above teachings. It is therefore to be understood that within the scope of the appended claims, the present invention may be practiced otherwise than as specifically described herein.

What is claimed is:

1. A drink container holder, comprising:
   an annular mounting base having a substantially U-shaped, inverted bracket-type mounting means, said mounting base including a pair of dependent shaft bearing portions integral with said annular mounting base and disposed at diametrically opposed positions along a first pivot axis with the center of said annular mounting base defined between said bearing portions;
   an annular holding framework including a substantially U-shaped cup holding frame, dependently supported from and integral with said annular holding framework, disposed internally within said annular mounting base, said holding framework including a pair of shaft bearing portions disposed at diametrically opposed positions along a second pivot axis, which is disposed substantially perpendicular to said first pivot axis, with the center of said annular holding framework defined between said pair of shaft bearing portions of said annular holding framework; and
   an annular intermediate framework interposed between said annular mounting base and said annular holding framework, said intermediate framework including first and second pairs of shaft bearing portions for respectively accommodating said shaft bearing portions of said annular mounting base and said annular holding framework, the first pair of shaft bearing portions of said annular intermediate framework being provided at diametrically opposed positions along said first axis, the second pair of shaft bearing portions of said annular intermediate framework being provided at diametrically opposed positions along said second axis crossing said first axis at right angles thereto, said first pair of shaft bearing portions of said intermediate framework pivotably bearing said shaft bearing portions of said mounting base, said second pair of shaft bearing portions of said intermediate framework pivotably bearing said shaft bearing portions of said holding framework.

2. The holder of claim 1, wherein said mounting base, said holding framework, and said intermediate framework are concentrically connected to one another.

3. A holder as set forth in claim 1, wherein:
said dependent shaft bearing portions of said annular mounting base comprise brackets having bearing apertures defined therein; and
said first pair of shaft bearing portions of said annular intermediate framework comprises a pair of radially outwardly projecting bearing shafts integrally formed upon an outer peripheral surface of said annular intermediate framework.

4. A holder as set forth in claim 1, wherein:
said shaft bearing portions of said annular holding framework comprises a pair of radially outwardly projecting bearing shafts integrally formed upon an outer peripheral surface of said annular holding framework; and
said second pair of shaft bearing portions of said annular intermediate framework comprises a pair of bearing slots formed within peripheral sidewall surfaces of said annular intermediate framework.

5. A holder as set forth in claim 1, wherein:
said substantially U-shaped cup holding frame comprises a substantially U-shaped bail.

6. A drink container holder as set forth in claim 1, wherein:
said annular holding framework and said annular intermediate framework comprise gimbal ring structures.

7. A drink container holder as set forth in claim 1, wherein:
said first pivot axis of said annular mounting base is axially aligned with a longitudinal extent of a base portion, of said substantially U-shaped, inverted bracket-type mounting means, which interconnects the leg portions of said substantially U-shaped inverted bracket-type mounting means.

8. A drink container holder as set forth in claim 1, wherein:
the upper ends of said dependent, substantially U-shaped cup-holding frame are aligned with said second pivot axis.

9. A drink container holder, comprising:
a substantially U-shaped, inverted, bracket-type mounting means for mounting said container holder upon a support surface;
an annular frame member, having aperture means defined therein and extending therethrough, integrally formed with said substantially U-shaped, inverted bracket-type mounting means and having dependent bracket-type bearing means integrally formed therewith at diametrically opposed positions with respect thereto as as to define a first diametrically extending pivot axis;
a first ring member;
means formed upon said first ring member for cooperating with said dependent bracket-type bearing means of said annular frame member such that said first ring member is pivotably mounted interiorly within said aperture means of said annular frame member and upon said annular frame member about said first pivot axis;
a second ring member;
means formed upon said first and second ring members for pivotably mounting said second ring member interiorly within said first ring member and upon said first ring member about a second pivot axis which crosses said first pivot axis at a central portion thereof and at right angles thereto; and
a substantially U-shaped cup holding frame dependently supported from and integral with said second ring member for holding and supporting said drink container.

10. A drink container holder as set forth in claim 9, wherein:
annular frame member and said first and second ring members are concentrically disposed with respect to each other.

11. A drink container holder as set forth in claim 9, wherein:
said dependent bracket-type bearing means of said annular frame member have bearing apertures defined therein; and
said cooperating means of said first ring member comprise bearing shafts projecting radially outwardly from external peripheral surface portions of said first ring member.

12. A drink container holder as set forth in claim 9, wherein:
said pivotably mounting means formed upon said first and second ring members comprise slots formed within said first ring member and bearing shafts projecting radially outwardly from external peripheral surface portions of said second ring member.

13. A drink container holder as set forth in claim 9, wherein:
said first and second ring members comprise gimbal ring structures.

14. A drink container holder as set forth in claim 9, wherein:
said first pivot axis of said annular frame member is axially aligned with a longitudinal extent of a base portion, of said substantially U-shaped, inverted bracket-type mounting means, which interconnects the leg portions of said substantially U-shaped inverted bracket-type mounting means.

15. A drink container holder as set forth in claim 9, wherein:
the upper ends of said dependent, substantially U-shaped cup holding frame are aligned with said second pivot axis.

* * * * *